United States Patent [19]

Batenburg et al.

[11] Patent Number: 5,852,362
[45] Date of Patent: Dec. 22, 1998

[54] DEVICE FOR MAGNETIC-INDUCTIVE MEASUREMENT OF THE QUANTITY OF MIXTURE FLOWING THROUGH A PIPELINE

[75] Inventors: Arie Cornelis Batenburg, Papendrecht; Aart Jan Van Bekkum, Hoornaar; Cornelis Hendrik Van Den Berg, Sliedrecht; Alexander Marnix Heijnsdijk, Papendrecht; Casparus Henricus Marius Kramers, Maarssen; Teunis Visser, Sliedrecht; Antonie Cornelis Van Zutphen, Zwijndrecht, all of Netherlands

[73] Assignee: FHC Systems B.V. and Krohne Altometer, Sliedrecht, Netherlands

[21] Appl. No.: 575,210

[22] Filed: Dec. 19, 1995

[30] Foreign Application Priority Data

Jan. 5, 1995 [NL] Netherlands .............................. 9500022

[51] Int. Cl.$^6$ ............................ G01N 27/74; G01N 27/87
[52] U.S. Cl. ........................................ 324/204; 73/861.12
[58] Field of Search ..................... 324/204, 236, 324/234, 241; 73/861.12, 861.11, 861.16, 861.15; 285/45, 47; 406/193; 340/618, 620

[56] References Cited

U.S. PATENT DOCUMENTS 4,130,300 12/1978 Sheridan ..................... 285/16
4,285,239 8/1981 Heine et al. .............................. 73/434
4,522,073 6/1985 Knaak ................................... 73/861.12
5,179,346 1/1993 McGee et al. ........................... 324/204

FOREIGN PATENT DOCUMENTS

| 0 111 187 | 6/1984 | European Pat. Off. . |
| 0 207 771 | 1/1987 | European Pat. Off. . |
| 0 242 860 | 10/1987 | European Pat. Off. . |
| 0 455 357 | 11/1991 | European Pat. Off. . |
| 1 498 397 | 6/1969 | Germany . |
| 0 581 017 | 2/1994 | Germany . |
| 43 02 158 | 7/1994 | Germany . |
| 2 165 328 | 4/1986 | United Kingdom . |

*Primary Examiner*—Walter E. Snow
*Assistant Examiner*—Jay M. Patidar
*Attorney, Agent, or Firm*—Foley & Lardner

[57] ABSTRACT

A device and a method for its manufacture, for magnetic-inductive measurement of the quantity of mixture flowing through a pipeline into which the device has been incorporated. The device includes a housing having a measuring tube with an electrically insulating lining therein. The lining substantially consists of wear-resistant, insulating ceramic material in the form of tiles applied on a layer of plastic material having a thickness between 3 and 10 mm. The joints between the tiles are filled with plastic material. The housing contains magnetic coils. A pair of electrodes are mounted in the measuring tube and extend through the wall of the measuring tube and are insulated in relation to it. Within the housing, the electrodes are connected to lines leading to measuring members for measuring the voltage difference generated in the flowing medium by the magnetic field of the magnetic coils.

12 Claims, 2 Drawing Sheets

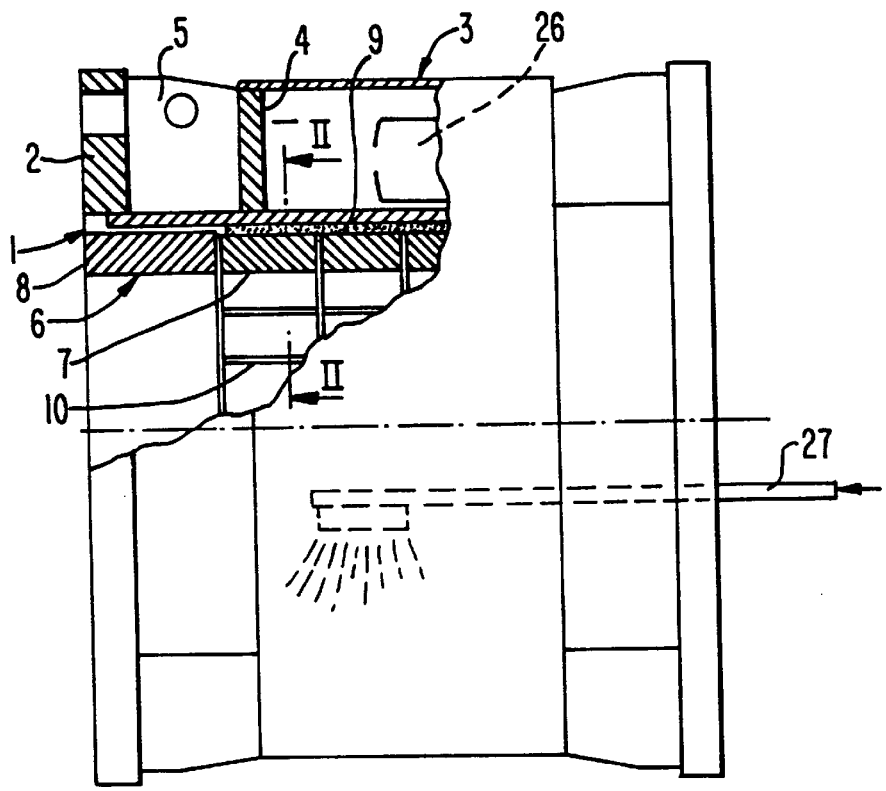
FIG. 1
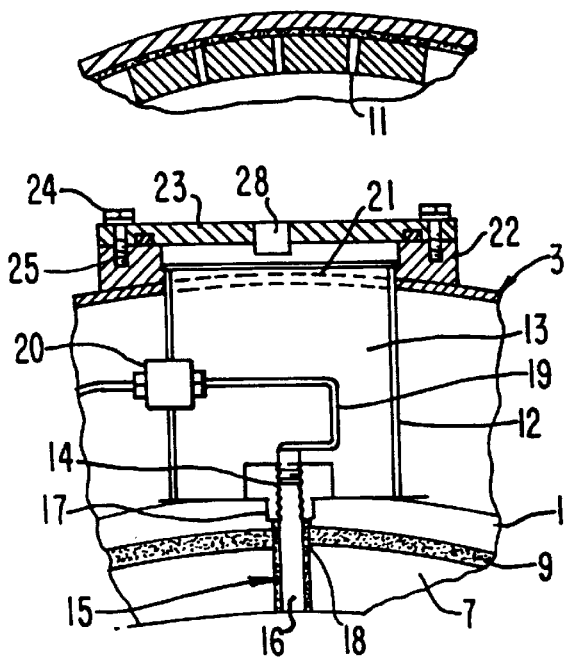
FIG. 2
FIG. 3

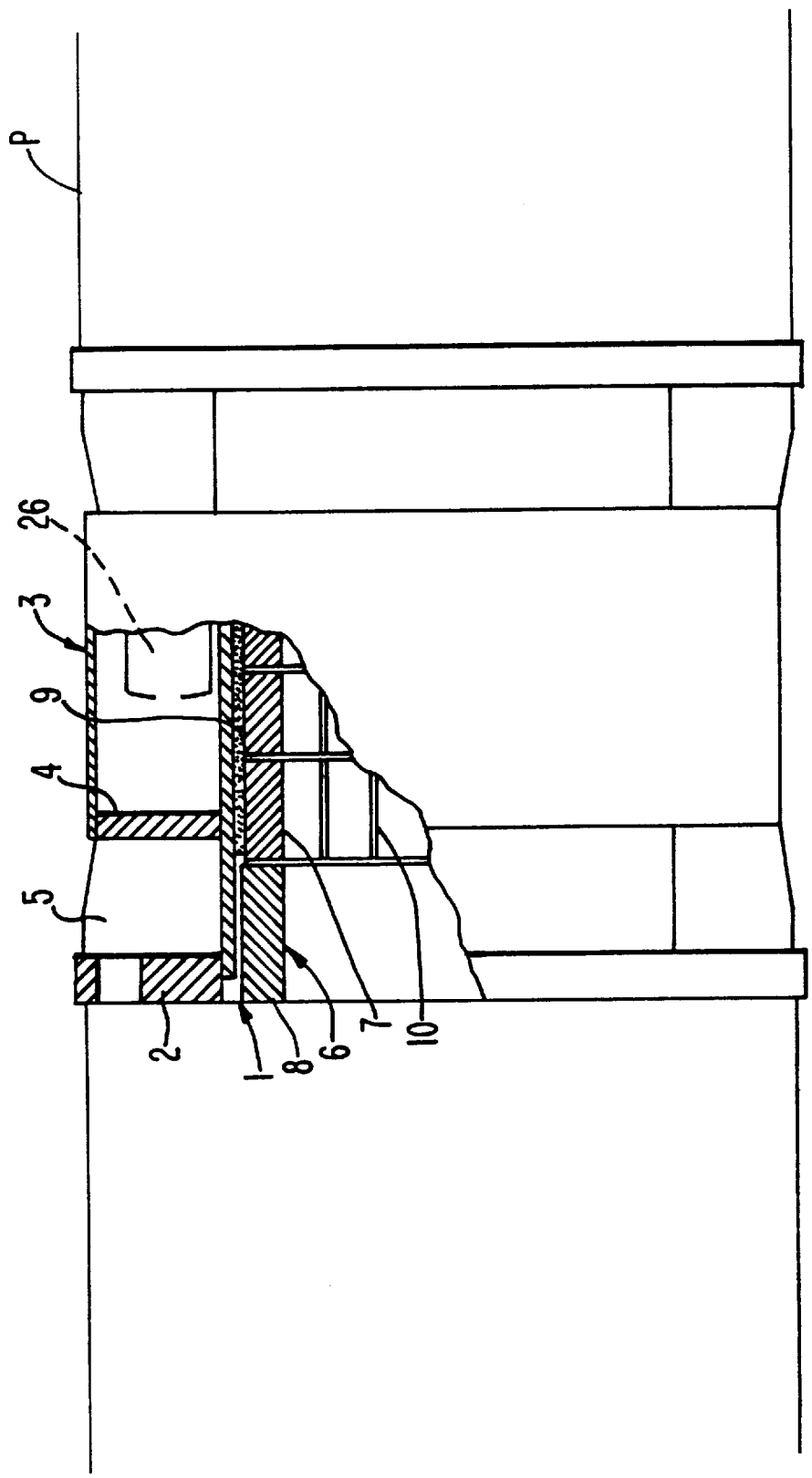

DEVICE FOR MAGNETIC-INDUCTIVE MEASUREMENT OF THE QUANTITY OF MIXTURE FLOWING THROUGH A PIPELINE

FIELD OF THE INVENTION

The invention relates to a device for magnetic-inductive measurement of the quantity of mixture flowing through a pipeline, the device comprising a housing with a measuring tube in it, the tube being mountable in the pipeline by flanges or in a similar way and being provided with an electrically insulating inner lining, magnet coils being situated within the housing and outside of the measuring tube and a pair of radially opposed electrodes being mounted in the measuring tube and extending from the outside through the wall of the measuring tube and into the measuring tube, and being insulated in relation to the metal tube wall. At the outside of the tube wall, the electrodes are connected to lines leading to measuring members for measuring the voltage difference that can be generated in the flowing medium by the magnetic field of the magnet coils.

BACKGROUND OF THE INVENTION

Such a device is known from DE-A-1498397 and is used e.g. for determining the liquid flow of the mud mixture or the slurry in a mud transport line. Therein, solid material, such as sand, sludge, rock or coral and the like is carried along in the flowing medium, which usually will be water, as a consequence of which the wear of the measuring tube of the device will be considerable. In connection with that, in this known device the inner wall of the measuring tube is provided with an electrically insulating lining comprising individual elements adapted to the tube shape and consisting of e.g. wooden bars impregnated with phenol resin.

However, under said extreme circumstances, the life of the measuring tube of this known device will be relatively short. Afterwards, repair of the device will be necessary. If possible, the measuring tube will be provided with a new wear-resistant layer, to which end the old layer has to be removed first, so that such a replacement will not be easy. Since certain sensitive members, such as the electrodes and the magnet coils, are situated in and near the measuring tube, removing and reinstalling a wear-resistant layer will at the same time involve the risk of damaging these members.

Further, there is a chance that on damaging the Inner wall of the measuring tube near the electrodes during operation, water or mud mixture will reach the magnet coils, as a result of which they could be damaged.

It will be obvious that renewal of the wear-resistant layer will necessitate replacement of the entire device, which naturally will entail a standstill of the complete device for transport of dredged materials.

SUMMARY OF THE INVENTION

The object of the invention is to improve the known device in such a way, that the life of the device, in particular that of the measuring tube, is extended.

According to the invention, this has proven to be achievable in a suitable way, by coating the inner wall of the measuring tube with an insulating plastic layer having a thickness between 3 and 10 mm, having tiles from a wear-resistant insulating material fastened thereon, a ceramic material in particular, by means of plastic, in which the joints between the tiles have been filled with an insulating plastic and the tiles have been applied in such a way that the joints between the tiles are aligned with each other in longitudinal direction of the measuring tube.

While it has been shown that the life of a thus formed measuring tube will be extended considerably, at the same time, replacement of the lining of the measuring tube can be realized easier and thus cheaper.

By first applying the relatively thick plastic layer onto the inner wall of the measuring tube it is achieved, that if tiles would on account of heavy impact load, there will be no short-circuit between the electrical field induced in the flowing medium between the electrodes and the steel tube.

By fixing the tiles onto the initially applied plastic layer by using of plastic, one obtains a particularly good connection between the tiles and the tube.

Due to the fact that the joints between the tiles extend in a longitudinal direction of the measuring tube, and that the joints between the tiles are completely filed with plastic, it is possible to obtain a very smooth inner surface of the measuring tube. Due to that, there will be little chance that the edges of the tiles are damaged by rocks and the like hitting them.

The benefit of applying the joints is twofold. Firstly, a fixed, standard tile size can be used for all existing pipe diameters and secondly, tolerances in the dimensions of the tiles can be accomodated.

According to a preferred embodiment of the invention, aluminium oxide, $Al_2O_3$, will be used as the ceramic material for the tiles.

As the plastic for obtaining the insulating layer on which the tiles are applied, for glueing the tiles onto the insulating plastic layer and for filling the joints between the tiles, one can suitably use polyurethane or a like material, or a combination of like materials. Thus, it is not absolutely necessary to use one type of plastic material for the various purposes.

The thickness of the layer of plastic material which is applied on the inner surface of the measuring tube will be about 7 mm.

The risk of damaging the edges of the tiles by rocks or the like hitting them could exist at the end edges of the lining. At the point of the junction on the pipe line, differences in the diameters of the parts and in the alignment of the parts in relation to each other could occur.

To prevent this, it is provided, that the end edge of the tiles-comprising portion of the lining in the measuring tube connects to an end ring mounted in the measuring tube and made of wear- and impact-resistant cast or rolled steel known in practice. This part of the measuring tube need not consist of electrically insulating material.

Further, we can point to EP-A-0242860 which describes the use of ceramic tiles for coating the inner wall of a tube. However, there, the tiles are directly fixed to the inner wall of the in such a way that they are in close contact with each other. In addition they are applied in a helical pattern. Thus, there isn't any resilient, insulating layer between the tiles and the tube, so edges will be formed that could be hit by rocks and the like. Therefore, the edges of the tiles will be exposed to damaging.

According to the invention, it is further provided, that the end of each electrode projecting inwardly into the housing is mounted in a compartment within the housing and is closed off in relation to the further part of the housing so that the electrical connection of the electrode is led watertightly through the compartment wall.

If, due to damage to the tiles situated near the electrode, or to the electrode itself, water would penetrate into the housing, the water can not reach that part of the housing where the coils are situated.

According to a further development of the invention, when the measuring tube is provided with flanges for mounting to the pipe line, said flanges can be connected to each other by substantially axial ribs or the like, which can extend directly between the flanges or between the flanges and parts of the housing.

Owing to this, the rigidity of the measuring tube can be enhanced considerably without increasing the wall thickness of the tube. Therefore, the occurring deformation of the measuring tube can be largely limited and as a consequence can be limited the chance of occurrence of cracks in the tiles.

The device described above can suitably be combined with a mass concentration meter.

The invention also relates to a method of manufacturing the device described above, according to which the measuring tube provided with the housing and the like is placed in a device for rotatably supporting it and the end ring or end rings in the measuring tube are set. During rotation of the measuring tube, plastic in liquid condition is applied in axial and radial direction on the inner surface of the measuring tube by means of a supply member, while after application of the layer of plastic, when it has not yet completely cured, tiles of ceramic material are applied to the layer it with the help of glue.

By centrifugally casting the plastic layer onto the tube in the way described, one can obtain a plastic layer meeting high requirements. In particular, the layer will have the proper roundness so that the final tube will have a proper cross-section.

As glue for fixing the tiles onto the plastic one can use the same plastic as the one the layer consists of. Naturally, one could also use another glue.

According to a further development of the invention, it is provided, that once the tiles are fixed, the joints between the tiles are filled up, and the surface of the tiles is somewhat covered with plastic during rotation of the measuring tube. A supply member is used to applying the plastic in liquid condition onto the tiles in radial and axial direction.

BRIEF DESCRIPTION OF THE DRAWINGS

The invention is further explained by way of an embodiment shown in the drawing, in which:

FIG. 1 shows a side view and a partial section across a device according to the invention;

FIG. 2 shows in cross-section a part of the measuring tube of the device of FIG. 1 according to the line II—II of FIG. 1; and FIG. 3 shows in cross-section and on an enlarged scale a part of the measuring tube with the housing mounted on it, at the point where an electrode in a closed compartment is situated.

FIG. 4 show the location of the device in the pipeline.

DETAILED DESCRIPTION OF THE PREFERRED EMBODIMENT

FIG. 1 shows a measuring device according to the invention consisting of the measuring tube 1, provided with flanges 2 and with a housing 3 that can extend around the measuring tube 1. Ribs 5 for stiffening the measuring tube 1 have been mounted between the flanges 2 and the side walls 4 of the housing 3. Possibly, ribs can also be mounted within the housing 3.

The measuring tube 1 is provided with the lining 6 represented by ceramic tiles 7 and the end rings 8 of a wear-resistant and impact-resistant cast or rolled steel. The tiles are applied on a layer 9 of plastic such as polyurethane and the joints 10 between the tiles 7 are likewise filled with this material, while a thin layer of plastic can be present on the free surface of the tiles as well. The end rings 8 are connected to the tube 1 likewise substantially by means of the plastic layer 9. The thickness of the layer 9 can be from 3 to 10 mm and will preferably be about 7 mm.

The tiles are preferably applied in such a way, that the joints extending in longitudinal direction of the measuring tube are aligned with each other. As appears in particular from FIG. 2, due to this there will be less chance of irregularities occurring in the inner surface of the measuring tube. A dashed line 11 indicates when the device will in which the longitudinal joints of the tiles would be offset in relation to each other.

FIG. 3 shows the measuring tube 1 with the plastic layer 9 on its inner wall. The tiles 7 have been applied. The outer wall of the housing 3, in which by means of the wall 12 a compartment 13 is formed, contains one end 14 of an electrode 15. The other end 16 of the electrode is in the same plane as the inner surface of the tiles 7. The compartment 13 can have both a rectangular and a round shape.

For fixing the electrode 15 in the tube, a plastic plug 17 is fastened in the tube. The electrode 15 is screwed in the plug before the tiles 7 are applied in the tube. With the help of the thread, the electrode can be set to the desired height. The tile situated near the electrode is provided with a bore 18 through which the electrode extends with large play. On account of the thread on the electrode and the wide bore 18 in the tile, after pouring the tiles with plastic, the electrode 15 will be completely surrounded by plastic and be firmly incorporated therein.

In a way not further indicated, the electrode 15 is connected to a line 19 extending sealingly through the wall 12 of the compartment 13. For this pressurized water-tight lead-through one can use, e.g., a glass lead-through 20.

Since at the end of the life of the device, excessive overpressure in the compartment 13 could occur as a consequence of leakage, the compartment could be provided with an overpressure safeguard 28 for relieving it.

Compartment 13 is accessible by means of the opening 21, around which the flange 22 extends and which can be sealed off by means of the cover 23 being fixable to the flange 22 by means of bolts 24. Between the cover 23 and the flange 22 lies the O-ring 25 for sealing off the compartment 13 to the outside.

For fastening the electrode in the tube wall, one can also use only the plastic by which the tiles are fixed. In that case, the electrode will have to be kept in its place by means of a fitting during application of the tiles.

As already mentioned above, besides further electric and electronic components, magnet coils, illustrated diagrammatically and indicated by 26 in FIG. 1, which are necessary for performing the measurements, can be present in the housing 3. The device can be combined with a mass concentration meter as well. The electrodes are connected to line (19) leading to measuring members (not shown) for measuring the voltage difference that can be generated in the flowing medium by the magnetic field of the coils (26).

With the method according to the present invention, one uses a supporting device, not shown in the drawing, for the measuring tube 1 provided with flanges and housing, in such a way that it can be rotated. Subsequently, the end rings 8 in the measuring tube 1 are set, e,g., pins. Then, the measuring tube is rotated and during rotation of the measuring tube 1, the plastic 9 in liquid condition is sprayed onto the inner wall of the measuring tube with the help of the supply member 27. By this plastic, the end rings 8 are fixedly mounted in the housing too. While the plastic has not yet completely cured, the tiles 7 are applied on to the plastic it with the help of glue. Subsequently, the joints 10 between the tiles are filled with plastic, also with the help of the supply member 27, in which a thin layer of plastic will be applied onto the tiles. This happens again during rotation of the device and in almost the same way as application of the plastic layer 9.

Possibly, the supply member 27 can be provided with a nozzle (not shown) and be moved to and fro in order to distribute the plastic across the entire surface of the measuring tube.

Only one possible embodiment of a device and method according to the invention has been illustrated in the drawing and described above. Many changes can be made without being beyond the inventive idea.

We claim:

1. A device for magnetic-inductive measurement of a quantity of mixture flowing through a pipeline, the device comprising:

a measuring tube mounted in the pipeline and receiving the mixture flowing through the pipeline, the measuring tube including a metal wall with an inner side and an electrically insulative lining;

a housing surrounding the tube;

magnetic coils extending between the housing and the measuring tube, the magnetic coils having a magnetic field which generates a voltage difference in the mixture flowing through the measuring tube;

at least one electrode mounted in the tube, and extending through the metal wall of the tube from an outside of the wall to the inside of the wall; and measuring members located outside the measuring tube, and connected to the at least one electrode, the measuring members measuring the voltage difference generated in the mixture flowing through the measuring tube;

wherein the inner side of the metal wall of the measuring tube is coated with an insulating plastic layer having a thickness between 3 mm and 10 mm; and wherein a layer of ceramic tiles is adhered to the inner side of the metal wall by plastic, adjacent tiles being positioned such that joints between adjacent tiles extend in a longitudinal direction of the measuring tube, and plastic material filling the joints.

2. A device according to claim 1, wherein the ceramic tiles comprise aluminum oxide.

3. A device as claimed in claim 1, wherein the insulating plastic layer on the inner side of the metal wall of the measuring tube comprises polyurethane.

4. A device as claimed in claim 1, wherein the plastic for adhering the ceramic tiles comprises polyurethane.

5. A device as claimed in claim 1, wherein the plastic which fills the joints between adjacent tiles comprises polyurethane.

6. A device as claimed in claim 1, wherein the insulating plastic layer coating the inner side of the metal wall of the measuring tube has a thickness of about 7 mm.

7. A device as claimed in claim 1, wherein the measuring tube includes an end ring comprising cast or rolled steel, and the layer of ceramic tiles has an end edge connected to the end ring.

8. A device as claimed in claim 1, wherein the housing includes at least one compartment, and each electrode is mounted in a watertight way in a compartment and extends through a wall of the compartment.

9. A device according to claim 1, wherein the measuring tube includes a plurality of flanges connected to each other by at least one rib extending in an axial direction of the measuring tube.

10. A device according to claim 1, wherein the measuring tube includes a plurality of flanges which are connected to the housing by at least one rib extending in an axial direction of the measuring tube.

11. A method of manufacturing a device for magnetic-inductive measurement of a quantity of mixture flowing through a pipeline, comprising the steps of:

providing a housing and a measuring tube;

placing the measuring tube in the housing;

placing the housing in a device to rotatably support the housing;

rotating the housing and the measuring tube;

applying liquid plastic from a supply member to an inner surface of the measuring tube, during rotation, to form a layer of plastic;

adhering ceramic tiles to the layer of plastic before the layer of plastic is completely cured.

12. A method according to claim 11, further comprising:

rotating the measuring tube;

applying liquid plastic from the supply member, during rotation, to fill joints created between adjacent ceramic tiles, such that a surface of the tiles is covered with the plastic.

* * * * *

UNITED STATES PATENT AND TRADEMARK OFFICE
CERTIFICATE OF CORRECTION

PATENT NO. : 5,852,362
DATED : December 22, 1998
INVENTOR(S) : Arie C. BATENBURG et al It is certified that error appears in the above-identified patent and that said Letters Patent is hereby corrected as shown below:

Please note on front cover of patent Item [73] Assignee, contains a typographical error wherein "FHC Systems B.V. and Krohne Altometer" should read --IHC Systems B.V. and Krohne Altometer--.

Signed and Sealed this

Eleventh Day of April, 2000

Attest:

Q. TODD DICKINSON

Attesting Officer

Director of Patents and Trademarks